US007367601B2

(12) United States Patent
Ogimoto

(10) Patent No.: US 7,367,601 B2
(45) Date of Patent: May 6, 2008

(54) SUBSTRATE TRANSFER APPARATUS AND SUBSTRATE TRANSFER METHOD

(75) Inventor: Shinichi Ogimoto, Ebina (JP)

(73) Assignee: Shibaura Mechatronics Corporation, Yokohama-Shi (JP)

( * ) Notice: Subject to any disclaimer, the term of this patent is extended or adjusted under 35 U.S.C. 154(b) by 640 days.

(21) Appl. No.: 10/480,924

(22) PCT Filed: Nov. 1, 2001

(86) PCT No.: PCT/JP01/09604

§ 371 (c)(1),
(2), (4) Date: Dec. 16, 2003

(87) PCT Pub. No.: WO03/037576

PCT Pub. Date: May 8, 2003

(65) Prior Publication Data

US 2004/0195850 A1    Oct. 7, 2004

(51) Int. Cl.
*B25J 15/06* (2006.01)
(52) U.S. Cl. ............................ 294/64.1; 294/65; 29/743
(58) Field of Classification Search .................... 294/2, 294/64.1, 65; 414/752.1; 29/743
See application file for complete search history.

(56) References Cited

U.S. PATENT DOCUMENTS

| 3,651,957 | A | * | 3/1972 | Ball et al. ............... 414/226.02 |
| 4,631,815 | A | * | 12/1986 | Bocchicchio et al. ......... 29/739 |
| 4,723,353 | A | * | 2/1988 | Monforte ...................... 483/10 |
| 4,832,180 | A | * | 5/1989 | Ferrero ...................... 198/468.3 |
| 5,024,575 | A | * | 6/1991 | Anderson ..................... 414/627 |
| 5,050,919 | A | * | 9/1991 | Yakou ........................... 294/2 |
| 5,609,377 | A | * | 3/1997 | Tanaka ......................... 294/65 |

FOREIGN PATENT DOCUMENTS

JP    61-173823    8/1986

(Continued)

*Primary Examiner*—Dean J Kramer
(74) *Attorney, Agent, or Firm*—Oblon, Spivak, McClelland, Maier & Neustadt, P.C.

(57) ABSTRACT

The present invention provides a substrate carrying apparatus capable of surely carrying a substrate with electronic parts mounted thereon, at low costs without causing the electronic parts to fall off the substrate, and without damaging the substrate. A substrate carrying apparatus has an arm body capable of vertical and horizontal movement. The arm body is provided with a plurality of substrate suction pads capable of sticking to the upper surface of the glass substrate by suction to hold the glass substrate, and a plurality of electronic part suction pads disposed above the electronic parts so as to correspond to the electronic parts, respectively. The electronic part suction pads are capable of sticking to the upper surfaces of the electronic parts by suction to hold the electronic parts. The suction pads are connected to a suction device by suction lines. The suction pads are combined, respectively, with position adjusting mechanisms of adjusting the respective positions of the suction pads relative to the arm body. The position adjusting mechanisms adjust the respective positions of the suction pads relative to the arm body according to the size and position of the glass substrate, and the sizes and positions of the electronic parts. The electronic part suction pads are provided with springs, respectively, to enable the electronic part suction pads to come into contact with the electronic parts without exerting shocks on the electronic parts.

9 Claims, 6 Drawing Sheets

FOREIGN PATENT DOCUMENTS

| | | |
|---|---|---|
| JP | 67089/1988 | 5/1988 |
| JP | 97322/1990 | 8/1990 |
| JP | 7487/1991 | 1/1991 |
| JP | 133588/1992 | 12/1992 |
| JP | 2888/1993 | 1/1993 |
| JP | 6-255772 | 9/1994 |
| JP | 9-199577 | 7/1997 |
| JP | 10-109288 | 4/1998 |
| JP | 3005505 | 1/2000 |
| JP | 2000-77898 | 3/2000 |
| JP | 2000-183592 | 6/2000 |
| JP | 2000-309423 | 11/2000 |
| JP | 2002-12319 | 1/2002 |

\* cited by examiner

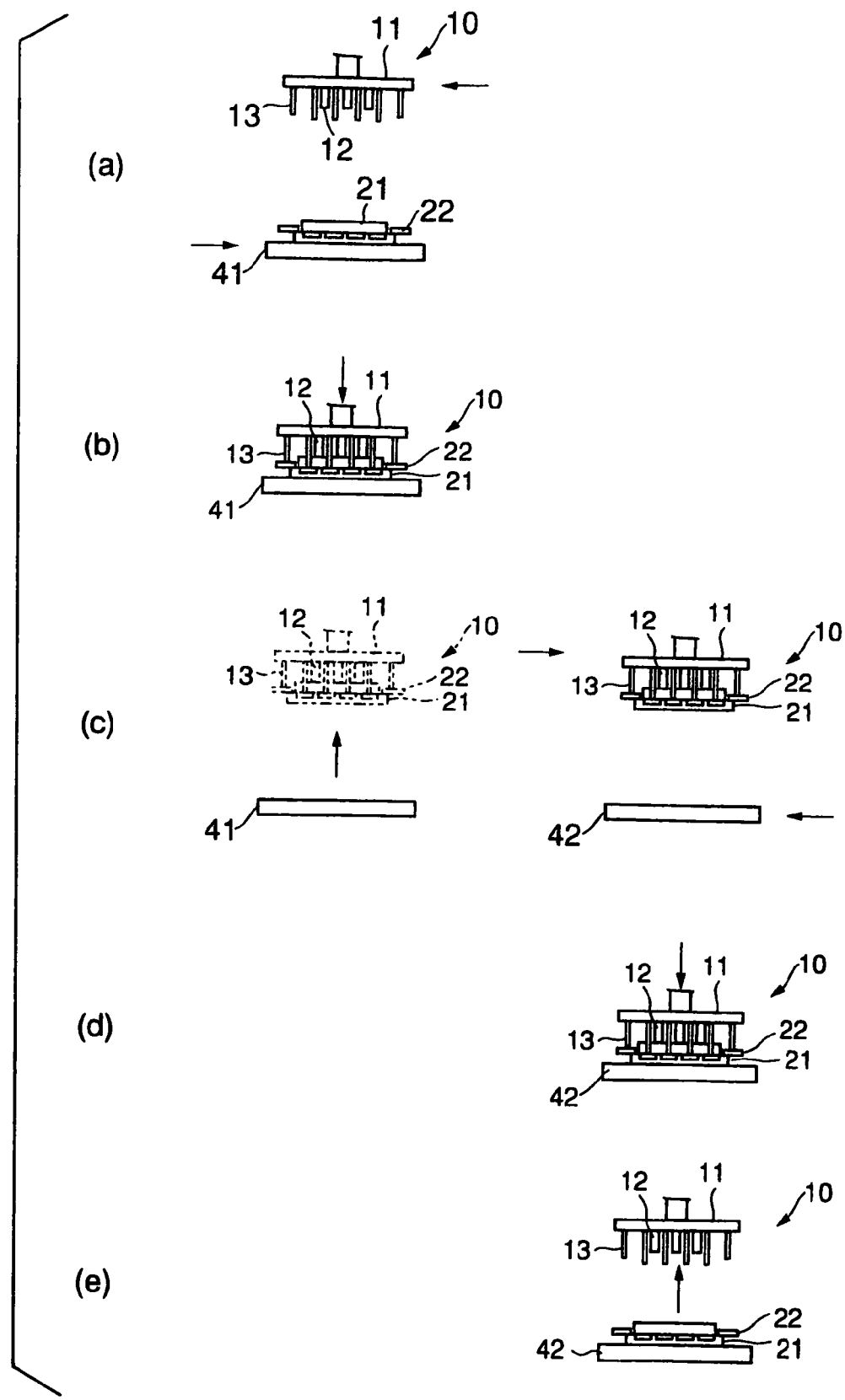
F I G. 2

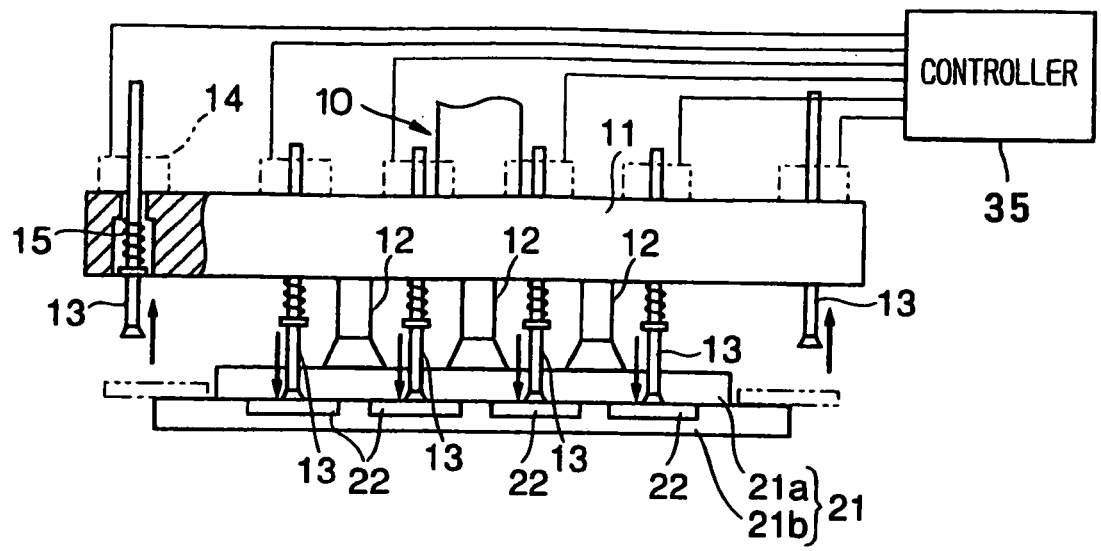
F I G. 3
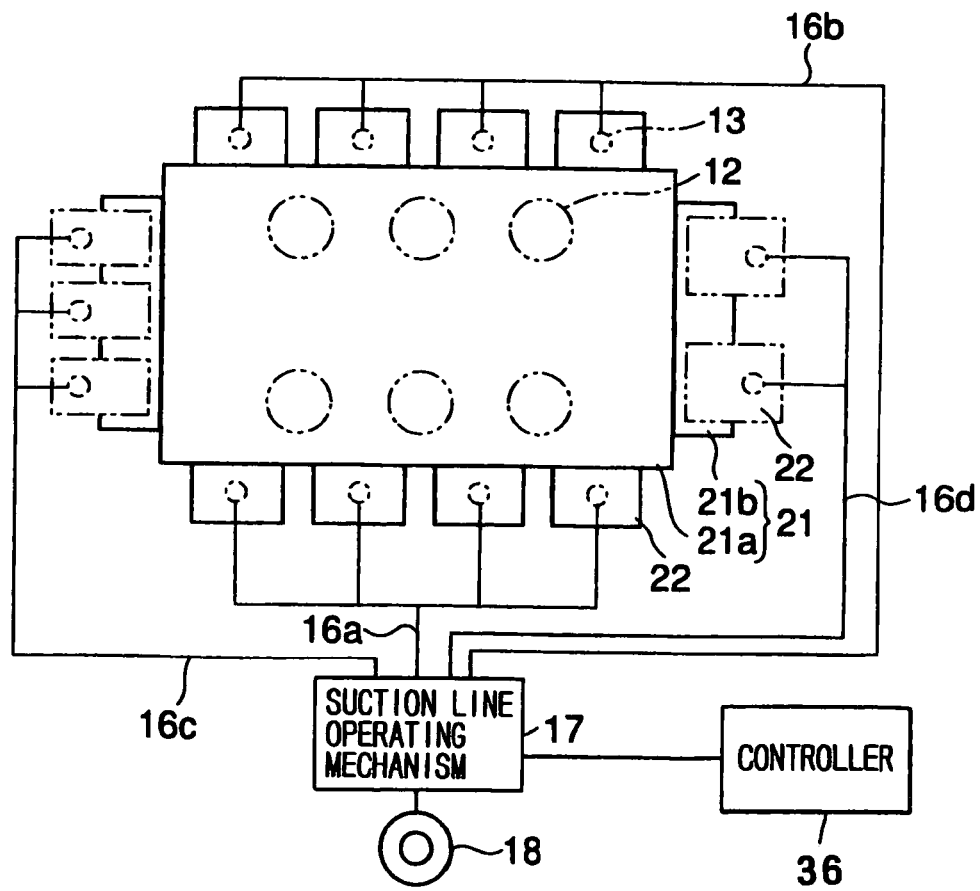
F I G. 4

SUBSTRATE TRANSFER APPARATUS AND SUBSTRATE TRANSFER METHOD

TECHNICAL FIELD

The present invention relates to a part-mounting apparatus to be used in fabricating a flat panel display and so on, such as a liquid crystal panel. More particularly, the present invention relates to a substrate carrying apparatus for transferring a glass substrate or such from one process to another process, and a substrate carrying method to be carried out by the substrate carrying apparatus.

BACKGROUND ART

A known part-mounting apparatus is used for mounting a film-shaped electronic part, such as a FPC (flexible printed circuit), a COF part (chip-on-film part) or a TCP (tape carrier package), on a glass substrate in fabricating a flat panel display such as a liquid crystal panel.

FIG. 6 shows, by way of example, a glass substrate with electronic parts that are mounted thereon by such a part-mounting apparatus. As shown in FIG. 6, a glass substrate 21 is formed by laminating two sheets 21a and 21b respectively having different sizes. A plurality of electronic parts 22 are mounted on the front and back surfaces of a peripheral portion of the glass substrate 21, i.e., the lower surface of the upper sheet 21a and the upper surface of the lower sheet 21b.

The glass substrate 21 thus provided with the electronic parts 22 is transferred from one process to another process by a substrate carrying apparatus 30 as shown in FIGS. 7A and 7B. Referring to FIGS. 7A and 7B, the substrate carrying apparatus 30 has an arm body 31 capable of vertical and lateral movement, and a plurality of suction pads 32 provided on the lower surface of the arm body 31 and capable of sticking to the upper surface of a glass substrate 21 by suction to hold the glass substrate 21. The substrate carrying apparatus 30 holds the glass substrate 21 (the glass substrate 21 with electronic parts 22 mounted thereon) by the suction pads 32 and carries the glass substrate 21 from one process to another process.

Recently, the dimensions of glass substrates for flat panel displays have progressively been increased and the dimensions of electronic parts mounted on the glass substrates have increased accordingly. Recent electronic parts to be mounted on the glass substrates include those having large outside dimensions and connected to a printed wiring board and a heat sink. When the substrate carrying apparatus 30 shown in FIGS. 7A and 7B carries a glass substrate 21 with such electronic parts 22 mounted thereon, the electronic parts 22 are caused to hang down from the glass substrate 21 by their own weight. Thus, there is a possibility that the hanging electronic parts 22 drop down during conveyance due to interference with other units or vibrations that act thereon (FIG. 7A). Moreover, there is a possibility that the electronic parts 22 are caused to strike against the glass substrate 21 due to vibrations that act thereon and thereby the glass substrate 21 is damaged (FIG. 7B).

Therefore, in the case of carrying a large glass substrate for a flat panel display or the like, it is a general method to place on a tray 33 a glass substrate 21 with electronic parts 22 mounted thereon, as shown in FIG. 8, and to carry the tray 33 holding the glass substrate 22 by a carrying arm or a carrying stage.

The tray 33 for carrying a large glass substrate is large and heavy. Therefore, it is difficult to handle the tray 33 manually and hence an additional tray handling mechanism for handling the tray 33 is necessary for returning the tray 33 from the succeeding process to the preceding process. The tray handling mechanism needs a space for installation and increases costs. Trays of different sizes must be used for fabricating different types of flat panel displays, i.e., for carrying glass substrates having different sizes, which increases the running cost.

DISCLOSURE OF THE INVENTION

The present invention has been made in view of those problems and it is therefore an object of the present invention to provide a substrate carrying apparatus and a substrate carrying method capable of surely carrying a substrate with electronic parts mounted thereon, at low costs without causing the electronic parts to fall off the substrate, and without damaging the substrate.

According to the present invention, a substrate carrying apparatus for carrying a substrate with electronic parts mounted thereon, includes: an arm body; a first support mechanism provided on the arm body and adapted to support a substrate to be carried, from above the same; and a second support mechanism provided on the arm body and adapted to support electronic parts mounted on the substrate, from above the same.

In the substrate carrying apparatus of the present invention, it is preferable that the first support mechanism includes a plurality of first support members arranged so as to correspond to the substrate. Preferably, the respective positions of the first support members provided on the arm body are adjustable. Preferably, a cushioning mechanism, which absorbs shocks that may be exerted on the substrate when each of the first support members comes into contact with the substrate, is interposed between the arm body and each of the first support members. The first support members may include suction members adapted to stick to the upper surface of the substrate by suction to hold the substrate.

In the substrate carrying apparatus of the present invention, it is preferable that the second support mechanism includes a plurality of second support members arranged so as to correspond to the electronic parts. Also preferably, the respective positions of the second support members provided on the arm body are adjustable. Preferably, a cushioning mechanism, which absorbs a shock that may be exerted on the respective electronic parts when each of the second support member comes into contact with the respective electronic parts, is interposed between the arm body and each of the second support members. The second support members may include suction members extending above the respective electronic parts and adapted to stick to the respective upper surfaces of the electronic parts by suction to hold the respective electronic parts or may include support arms extending above the electronic parts and adapted to receive respective lower surfaces of the electronic parts to hold the respective electronic parts.

Preferably, the substrate carrying apparatus of the present invention is provided with operation condition control means configured for controlling the operation conditions of each of the second support members.

The operation condition control means may include a drive mechanism of vertically moving each of the second support members so that the operation condition of each of the second support members may selectively be controlled by moving each of the second support members to either a working position for holding the corresponding electronic part or a retracted position spaced from the corresponding electronic part. Preferably, the operation condition control means further includes a controller for controlling the drive mechanism according to the type of the substrate to be carried.

In case that the second support members include suction members adapted to stick to the respective upper surfaces of the electronic parts by suction to hold the respective electronic parts, the operation condition control means may include a suction condition control mechanism for controlling the suction condition of each of the second support members so that the operation condition of each of the second support members may selectively be controlled by controlling the suction condition of each of the second support members. Preferably, the operation condition control means further includes a controller of controlling the suction condition control mechanism according to the type of the substrate to be carried.

The present invention also provides a substrate carrying method of carrying a substrate with electronic parts mounted thereon, from a first position to a second position, includes the steps of: lowering an arm body toward a substrate to be carried, from above the substrate, the substrate being located at the first position; supporting the substrate by a first support mechanism, the first support mechanism being provided on the arm body and adapted to support the substrate from above the substrate, while supporting the electronic parts by a second support mechanism, the second support mechanism being provided on the arm body and adapted to support the electronic parts from above the electronic parts; locating the substrate with the electronic parts mounted thereon, at the second position by vertically and horizontally moving the arm body; and releasing the substrate from the first support mechanism, while releasing the electronic parts from the second support mechanism.

Since the first support mechanism capable of supporting the substrate from above the substrate and the second support mechanism capable of supporting the electronic parts from above the electronic parts are provided on the arm body disposed above the substrate, the electronic parts are prevented from being caused to hang down by their own weight while the substrate is being carried. Thus, the substrate with the electronic parts mounted thereon, can surely be carried at low costs without causing the electronic parts to fall off the substrate, and without damaging the substrate.

Since the respective positions of the first support members and the second support members provided on the arm body are adjustable, the respective positions of the first support members and the second support members provided on the arm body can be adjusted according to the size and position of the substrate, and the sizes and positions of the electronic parts. Thus, the substrate carrying apparatus of the present invention is capable of optimally carrying different substrates respectively for different types of flat panel displays.

Since the substrate carrying apparatus of the present invention includes the cushioning mechanism interposed between the arm body and each of the second support members to absorb a shock that may be exerted on the respective electronic parts when each of the second support members comes into contact with the respective electronic parts, it is possible to avoid exerting unnecessary shocks and load on the electronic parts.

BRIEF DESCRIPTION OF THE DRAWINGS

FIG. 2 is a view of assistance in explaining a sequence of steps conducted by the substrate carrying apparatus shown in FIG. 1A for transferring the glass substrate from one process to another process;

FIG. 3 is a front elevation of a substrate carrying apparatus in a modification of the substrate carrying apparatus shown in FIG. 1A;

FIG. 4 is a front elevation of a substrate carrying apparatus in another modification of the substrate carrying apparatus shown in FIG. 1A;

BEST MODE FOR CARRYING OUT THE INVENTION

Preferred embodiments of the present invention will be described with reference to the accompanying drawings.

Figure 1A:
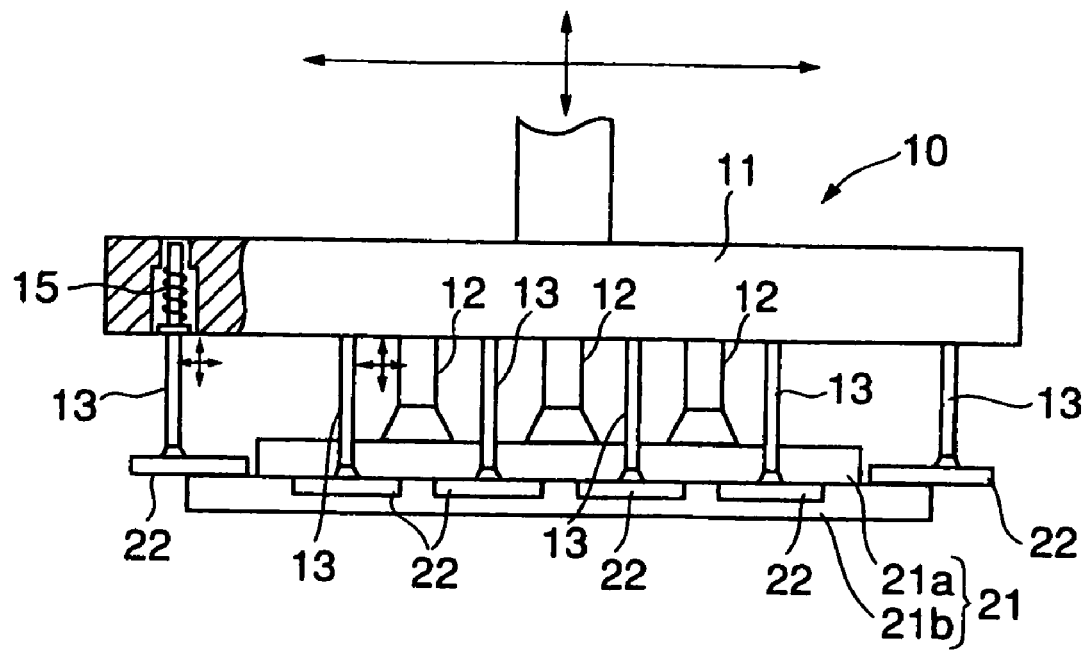
FIG. 1A is a front elevational view of a substrate carrying apparatus in a preferred embodiment of the present invention.
Figure 1B:
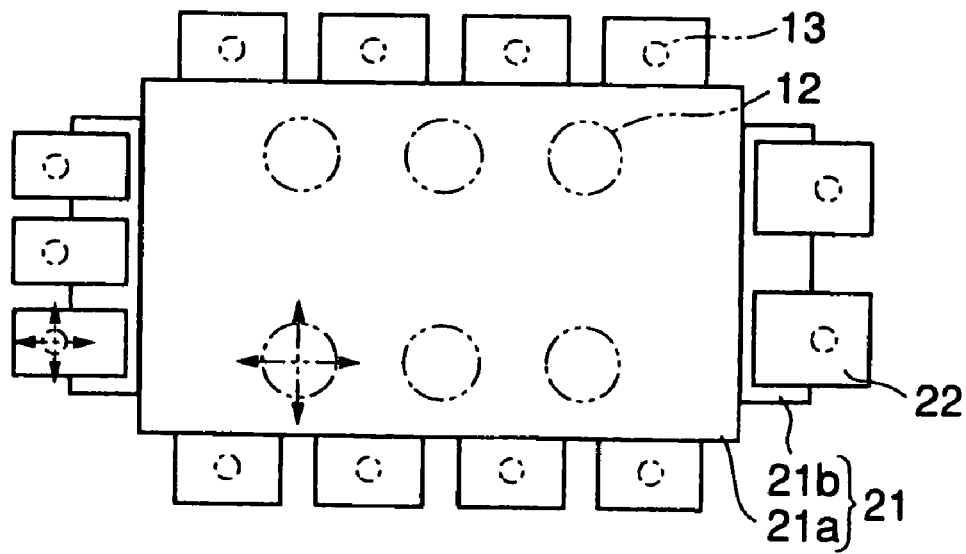
FIG. 1B is a plan view of a glass substrate with electronic parts mounted thereon, which is carried by the substrate carrying apparatus shown in FIG. 1A.

Referring to FIGS. 1A and 1B, a substrate carrying apparatus 10 in a preferred embodiment of the present invention carries a glass substrate 21 with electronic parts 22 mounted thereon, from one process to another process. The glass substrate 21 to be carried is formed by laminating two substrates 21a and 21b respectively having different sizes. The plurality of electronic parts 22 are mounted or attached to the upper and lower surfaces of a peripheral portion of the glass substrate 21, i.e., the lower surface of the upper substrate 21a and the upper surface of the lower substrate 21b.

As shown in FIGS. 1A and 1B, the substrate carrying apparatus 10 has an arm body 11 placed above the glass substrate 21 and adapted to move in vertical and horizontal directions. The arm body 11 is provided with a first support mechanism including a plurality of substrate suction pads 12 (first support members) adapted to stick to the upper surface of the glass substrate 21 by suction to hold the glass substrate 21. The arm body 11 is provided with a second support mechanism for supporting the electronic parts 22 mounted on the glass substrate 21 from above the electronic parts 22. The second support mechanism includes a plurality of electronic part suction pads 13 (second support members). The substrate suction pads 12 and the electronic part suction pads 13 are connected by suction lines denoted by reference characters 16a to 16d in FIG. 4 to a vacuum device 18 shown in FIG. 4.

The substrate suction pads 12 are provided, respectively, with position adjusting mechanisms, not shown, for adjusting the respective positions of the substrate suction pads 12 relative to the arm body 11. The respective positions of the substrate suction pads 12 relative to the arm body 11, i.e., the positions of the substrate suction pads 12 with respect to longitudinal, lateral and vertical directions relative to the arm body 11, can be adjusted according to the dimensions, i.e., length, width and thickness, and the position of the glass substrate 21. The electronic part suction pads 13 are provided, respectively, with position adjusting mechanisms, not shown, for adjusting the respective positions of the electronic part suction pads 13 relative to the arm body 11. The respective positions of the electronic part suction pads 13 relative to the arm body 11, i.e., the positions of the electronic part suction pads 13 with respect to longitudinal, lateral and vertical directions relative to the arm body 11, can be adjusted according to the dimensions, i.e., length, width and thickness, and the positions of the electronic parts 22. The electronic part suction pads 13 are provided with springs (cushioning mechanisms) 15, respectively, to enable the electronic part suction pads 13 to come into contact with the electronic parts 22 without exerting shocks on the electronic parts 22.

The electronic part suction pads 13 may be provided with sensors, not shown, respectively, to detect the operation condition of each of the electronic part suction pads 13, i.e., to identify whether or not the electronic part suction pads 13 are holding the electronic parts 22. The sensors combined with the electronic part suction pads 13 can effectively detect production of defective products due to the loss of electronic parts that should be on the products.

The sequence of steps conducted by the substrate carrying apparatus 10 in this embodiment will be described with reference to FIGS. 2(*a*), 2(*b*), 2(*c*), 2(*d*) and 2(*e*) on an assumption that the substrate carrying apparatus 10 carries the glass substrate 21 with the electronic parts 22 mounted thereon (hereinafter, referred to simply as "glass substrate 21") from a preceding process to a succeeding process.

The arm body 11 is moved leftward to locate the substrate carrying apparatus 10 at a substrate receiving position as shown in FIG. 2(*a*). At this stage, a substrate carrying stage 41 of the preceding process, supporting the glass substrate 21 is located at a substrate transfer position (first position).

Then, the arm body 11 is moved downward to lower the substrate carrying apparatus 10, all the substrate suction pads 12 and all the electronic part suction pads 13 are set in a sucking state (operative state) to hold the glass substrate 21 and the electronic parts 22 as shown in FIG. 2(*b*).

Subsequently, the arm body 11 is moved upward to raise the substrate carrying apparatus 10 and then the arm body 11 is moved rightward to move the substrate carrying apparatus 10 to a substrate delivering position (second position) in the succeeding process as shown in FIG. 2(*c*). At this stage, a substrate carrying stage 42 of the succeeding process is located at a substrate receiving position.

Then, the arm body 11 is moved downward to lower the substrate carrying apparatus 10 and the glass substrate 21 is placed on the substrate carrying stage 42 of the succeeding process as shown in FIG. 2(*d*).

Subsequently, all the substrate suction pads 12 and all the electronic part suction pads 13 are set in a nonsucking state (inoperative state) to release the glass substrate 21 and the electronic parts 22 from the substrate carrying apparatus 10. Then, the arm body 11 is moved upward to raise the substrate carrying apparatus 10 as shown in FIG. 2(*e*).

Since the substrate carrying apparatus 10 in this embodiment is provided with the substrate suction pads 12 for supporting the glass substrate 21 from above the glass substrate 21, and the plurality of electronic part suction pads 13 for supporting the electronic parts 22 from above the electronic parts 22, the electronic parts 22 can be prevented from being caused to hang down by their own weight from the glass substrate 21 while the glass substrate 21 is being carried. Thus, the glass substrate 21 with the electronic parts 22 mounted thereon, can surely be carried at low costs without causing the electronic parts 22 to fall off the glass substrate 21, and without damaging the glass substrate 21.

Since the respective positions of the substrate suction pads 12 and the electronic part suction pads 13 provided on the arm body 11 are adjustable in this embodiment, the respective positions of the substrate suction pads 12 and the electronic part suction pads 13 with respect to longitudinal, lateral and vertical directions relative to the arm body 11 can be adjusted according to the dimensions, i.e., length, width and thickness, and the positions of the glass substrate 21 and the electronic parts. Thus, different glass substrates respectively for different types of flat panel displays can optimally be carried.

Since the electronic part suction pads 13 are provided with springs (cushioning mechanisms) 15, respectively, to enable the electronic part suction pads 13 to come into contact with the electronic parts 22, it is possible to avoid exerting unnecessary shocks and load on the electronic parts 22.

Although all the electronic part suction pads 13 provided on the arm body 11 in the foregoing embodiments are set in an operative state in carrying the glass substrate 21. The operation conditions of the electronic part suction pads 13 are not limited thereto; the electronic part suction pads 13 may selectively be controlled according to the type of the flat panel display to be fabricated such that only the electronic part suction pads 13 that need to support the electronic parts 22 are set in the sucking state (operative state) and the rest are set in a nonsucking state (inoperative state).

More concretely, as shown in FIG. 3, the plurality of electronic part suction pads 13 are combined with drive mechanisms 14 for vertically moving the electronic part suction pads 13, respectively. A controller 35 set each of the electronic part suction pads 13 at a working position for holding the corresponding electronic part 22 or a retracted position spaced from the corresponding electronic part 22 according to the type of the substrate to be carried. The drive mechanisms 14 and the controller 35 constitute an operation condition control means.

As shown in FIG. 4, the electronic part suction pads 13 may be connected by the suction lines 16*a* to 16*d* to the vacuum device 18, and the respective operation conditions of the electronic part suction pads 13 may be controlled by changing the suction conditions of the suction lines by controlling a suction line operating mechanism 17 including solenoid valves and such by a controller 36. Although each suction line is respectively assigned to each of the sides of the glass substrate 21 in FIG. 4, suction lines may be assigned to each of the electronic part suction pads 13. Pad selection information about the electronic part suction pads 13 to be used may be stored in the controller 36 together with type information about the type of a flat panel display to be fabricated, and the respective operation conditions of the electronic part suction pads 13 may automatically be controlled according to the type of the substrate to be carried. The suction lines 16*a* to 16*d*, and the suction line operating mechanism 17 constitute a suction condition control mechanism. The suction lines 16*a* to 16*d*, the suction line operating mechanism 17 and the controller 36 constitute an operation condition control means.

Figure 5:
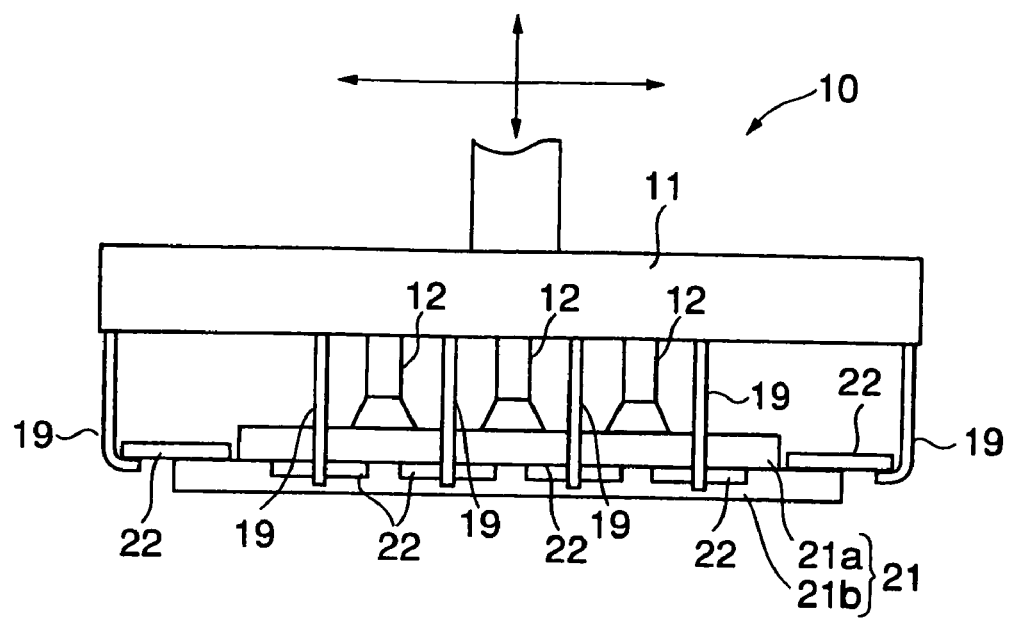
FIG. 5 is a front elevation of a substrate carrying apparatus in a further modification of the substrate carrying apparatus shown in FIG. 1A.
Figure 6:
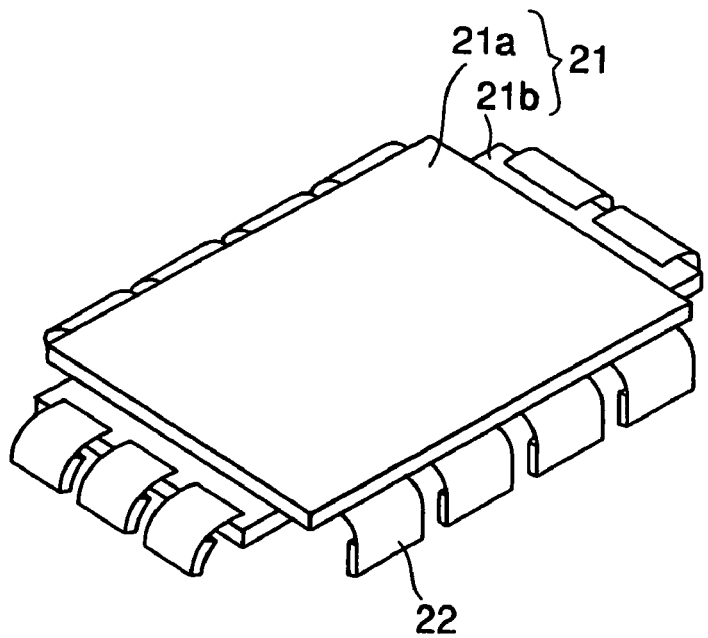
FIG. 6 is a perspective view of a glass substrate with electronic parts mounted thereon.
Figure 7A:
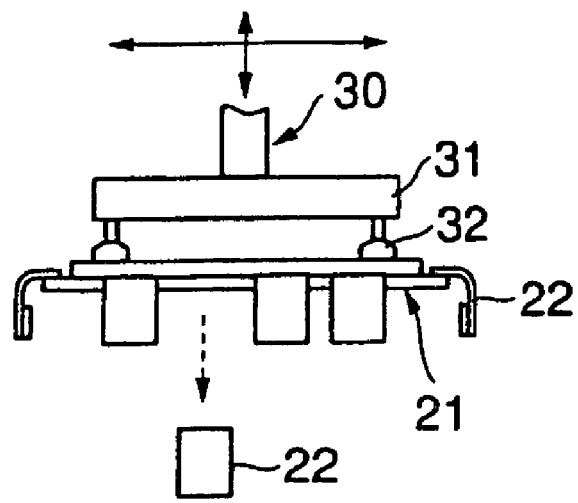
FIGS. 7A and 7B are schematic views of a conventional substrate carrying apparatus.
Figure 7B:
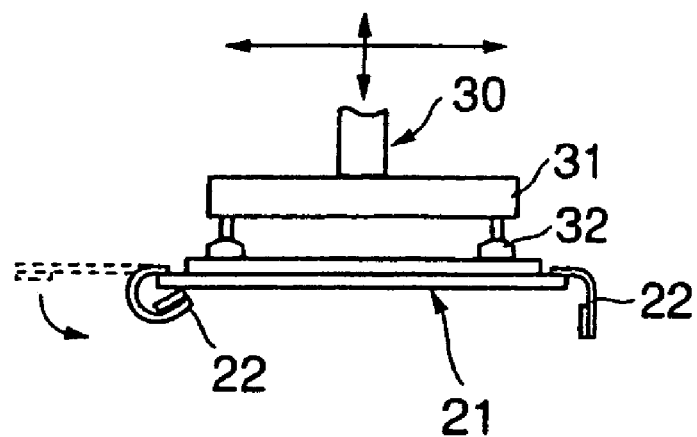
Figure 8:
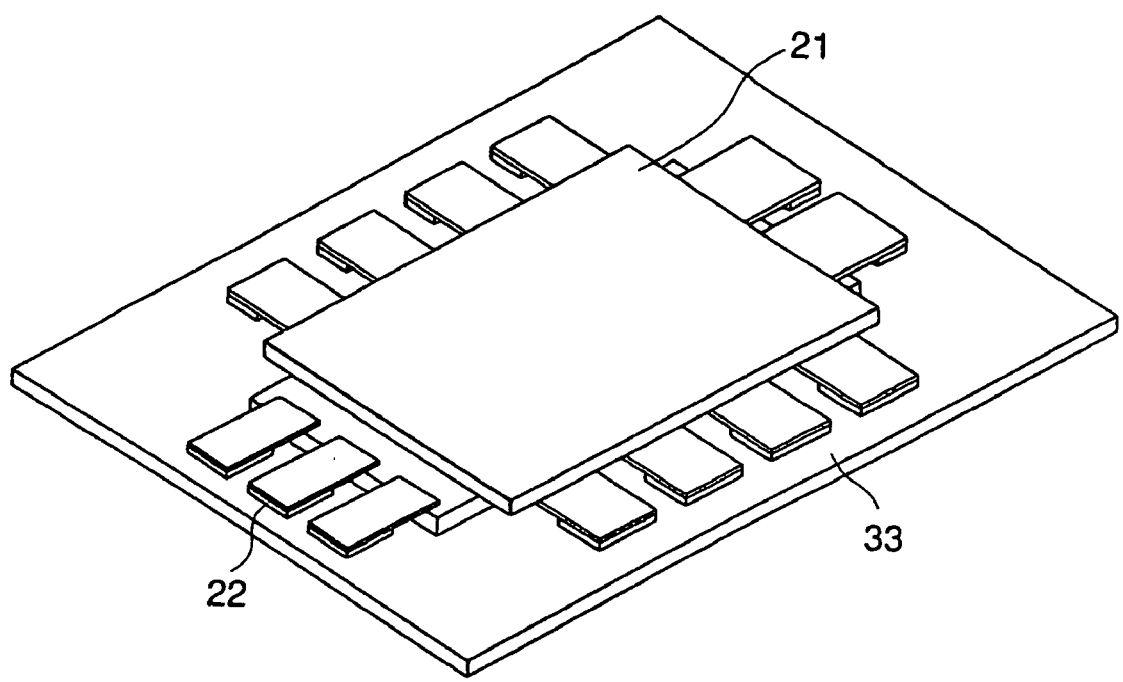
FIG. 8 is perspective view of assistance in explaining another conventional substrate carrying apparatus.

Although the electronic part suction pads 13 of the foregoing embodiment stick to the upper surfaces of the electronic parts 22 to hold the electronic parts 22, respectively, electronic part support arms 19 may be used instead of the electronic part suction pads 13, as shown in FIG. 5. The electronic part support arms 19 come into contact with the lower surfaces of the electronic parts 22 to hold the electronic parts 22.

Although the electronic part suction pads 13 are provided with the springs 15, respectively, in the foregoing embodiment, the substrate suction pads 12 may be provided with mechanisms similar to the springs 15.

Although the invention has been described in terms of an embodiment as applied to carrying a glass substrate for a flat panel display, the present invention is applicable to carrying any type of substrate.

The invention claimed is:

1. A substrate carrying apparatus configured for carrying a substrate with electronic parts mounted thereon, said substrate carrying apparatus comprising:
   an arm body;
   a first support mechanism provided on the arm body and adapted to support a substrate to be carried, from above the same; and
   a second support mechanism provided on the arm body and adapted to support electronic parts mounted on the substrate, from above the same,
   wherein the first support mechanism includes a plurality of first support members arranged so as to correspond to the substrate,
   wherein the first support members include suction members adapted to stick to an upper surface of the substrate by suction to hold the substrate,
   wherein the second support mechanism includes a plurality of second support members arranged so as to correspond to the electronic parts,
   wherein the second support members include suction members extending above the respective electronic parts and adapted to stick to respective upper surfaces of the electronic parts by suction to hold the respective electronic parts, and
   wherein the suction members of the second support members are positioned outside the suction members of the first support members in such that a positioning area of the suction members of the second support members surrounds a positioning area of the suction members of the first support members in a plan view thereof, and the suction members of the second support members are continuously positioned below the suction members of the first support members in elevation so that the suction members of the first support members and the suction members of the second support members securely stick to the upper surface of the substrate and the respective upper surfaces of the electric parts respectively.

2. The substrate carrying apparatus according to claim 1, wherein a cushioning mechanism is interposed between the arm body and each of the second support members, said cushioning mechanism absorbing a shock exerted on the substrate when each of the second support members comes into contact with the substrate.

3. The substrate carrying apparatus according to claim 1, wherein a cushioning mechanism is interposed between the arm body and each of the second support members, said cushioning mechanism absorbing a shock exerted on the electronic parts when each of the second support members comes into contact with the respective electronic parts.

4. The substrate carrying apparatus according to claim 1, further comprising an operation condition control means configured for controlling an operation condition of each of the second support members.

5. The substrate carrying apparatus according to claim 4, wherein the operation condition control means includes a drive mechanism of vertically moving each of the second support members so that the operation condition of each of the second support members is selectively controlled by moving each of the second support members to either a working position for holding the corresponding electronic part or a retracted position spaced from the corresponding electronic part.

6. The substrate carrying apparatus according to claim 5, wherein the operation condition control means further includes a controller configured for controlling the drive mechanism according to a type of the substrate to be carried.

7. The substrate carrying apparatus according to claim 4, wherein the second support members include suction members adapted to stick to respective upper surfaces of the electronic parts by suction to hold the respective electronic parts, and the operation condition control means includes a suction condition control mechanism of controlling a suction condition of each of the second support members so that the operation condition of each of the second support members is selectively controlled by controlling the suction condition of each of the second support members.

8. The substrate carrying apparatus according to claim 7, wherein the operation condition control means further includes a controller of controlling the suction condition control mechanism according to a type of the substrate to be carried.

9. A substrate carrying method of carrying a substrate with electronic parts mounted thereon, from a first position to a second position, said substrate carrying method comprising the steps of:
   lowering an arm body toward a substrate to be carried, from above the substrate, the substrate being located at the first position;
   supporting the substrate by a first support mechanism, said first support mechanism being provided on the arm body and adapted to support the substrate from above the substrate, while supporting the electronic parts by a second support mechanism, said second support mechanism being provided on the arm body and adapted to support the electronic parts from above the electronic parts;
   locating the substrate with the electronic parts mounted thereon, at the second position by vertically and horizontally moving the arm body; and
   releasing the substrate from the first support mechanism, while releasing the electronic parts from the second support mechanism,
   wherein the first support mechanism includes a plurality of first support members arranged so as to correspond to the substrate,
   wherein the first support members include suction members adapted to stick to an upper surface of the substrate by suction to hold the substrate,
   wherein the second support mechanism includes a plurality of second support members arranged so as to correspond to the electronic parts,
   wherein the second support members include suction members extending above the respective electronic parts and adapted to stick to respective upper surfaces of the electronic parts by suction to hold the respective electronic parts, and
   wherein the suction members of the second support members are positioned outside the suction members of the first support members in the plan view and below the suction members of the first support members in the front elevation so that the suction members of the first support members and the suction members of the second support members can securely stick to the upper surface of the substrate and the respective upper surfaces of the electric parts respectively.

* * * * *